United States Patent [19]
Klepac

[11] Patent Number: 5,873,776
[45] Date of Patent: Feb. 23, 1999

[54] WEIGHT-ACTIVATED, EXPANDING GAMBREL APPARATUS AND METHOD OF USING SAME

[76] Inventor: Daniel T. Klepac, 5411 Rancho Rd., Needville, Tex. 77461

[21] Appl. No.: 747,189

[22] Filed: Nov. 12, 1996

[51] Int. Cl.$^6$ ..................................................... A22B 5/00
[52] U.S. Cl. ........................................... 452/191; 452/192
[58] Field of Search .................................. 452/191, 187, 452/188, 189, 192

[56] References Cited

U.S. PATENT DOCUMENTS

| | | | |
|---|---|---|---|
| 892,719 | 7/1908 | Gratton | 452/191 |
| 916,010 | 3/1909 | Poist | 452/191 |
| 1,117,436 | 11/1914 | Person | 452/191 |
| 2,750,224 | 6/1956 | Matheny | 452/191 |
| 5,236,386 | 8/1993 | Dingee | 452/190 |
| 5,288,265 | 2/1994 | Beason et al. | 452/189 |

OTHER PUBLICATIONS

Moultrie Feeders, Moultrie Feeders—A Pattern of Success catalog, Jan. 1, 1995.
Gander Mountain, Gander Mountain catalog, Fall 1994, p. 232.

*Primary Examiner*—Willis Little
*Attorney, Agent, or Firm*—Pravel, Hewitt & Kimball

[57] ABSTRACT

An expanding gambrel apparatus and method for supporting a slaughtered animal. The gambrel apparatus includes a pair of support arms each having an arcuate end forming a hook. The pair of support arms are pivotally connected to each other. A pair of braces are pivotally connected to each other and to the support arms. A center post is connected to the braces and a bracket is connected to the support arms. The center post abuts the bracket and maintains the support arm hooks at a certain spacing when supporting the animal. A rope is attached to the center post and has a free end which extends through a hole in the bracket. The gambrel apparatus has a collapsed position and an expanded position. In the collapsed position, the hooks are closely situated to one another and the center post is separated from the bracket. The hook of a first support arm is first inserted through the animal's hind leg. The other hook of the second support arm is then extended to the appropriate location and inserted into the animal's other hind leg. The rope free end extends from the gambrel apparatus and may be connected to a hoisting apparatus for raising and suspending the animal from the gambrel apparatus. As the free end is pulled to raise the animal, the raising of the gambrel apparatus is resisted by the weight of the animal. This results in the rope being tensioned and causing the center post to be forcibly drawn closer to the bracket. As this happens, the pair of braces force the hooks away from one another to expand the gambrel apparatus. With continued tensioning of the rope, the center post will finally abut a lower shoe of the bracket to fully expand the gambrel apparatus. Continued tensioning on the rope results in the raising of the gambrel apparatus and the slaughtered animal.

3 Claims, 1 Drawing Sheet

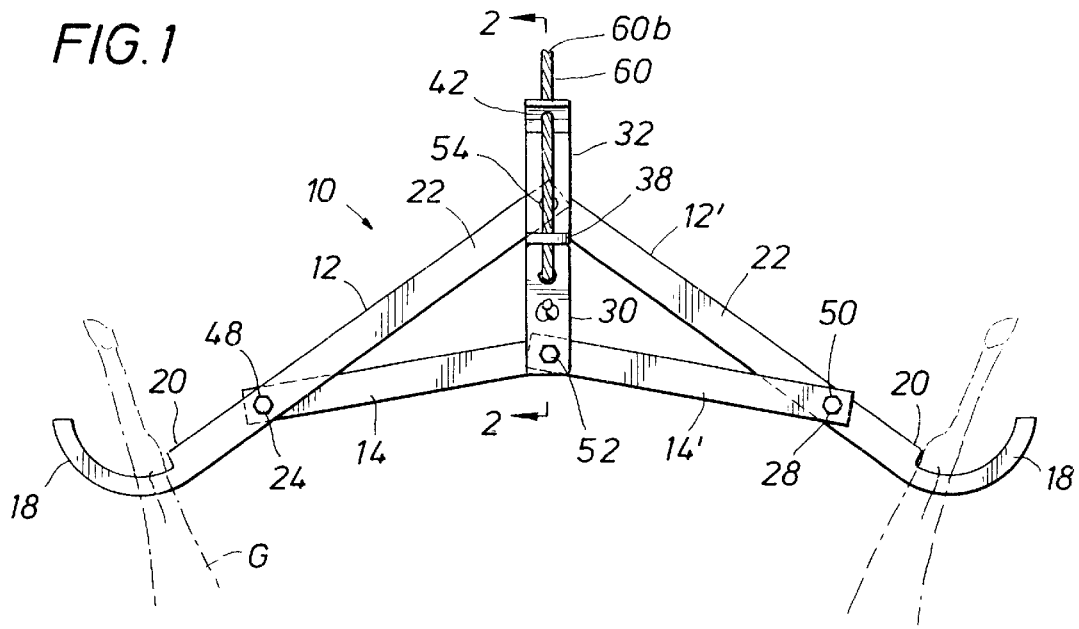
FIG. 1
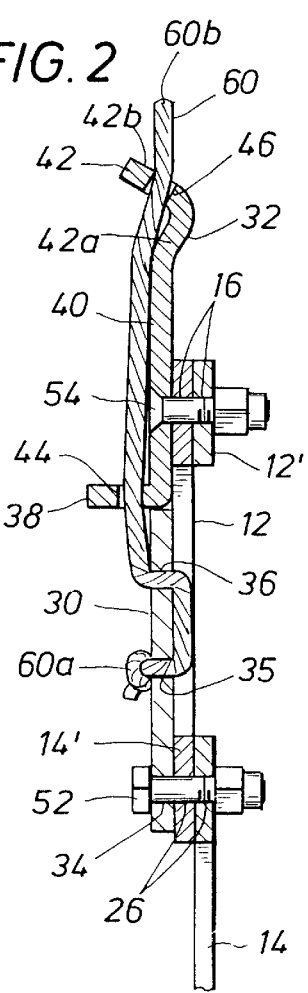
FIG. 2
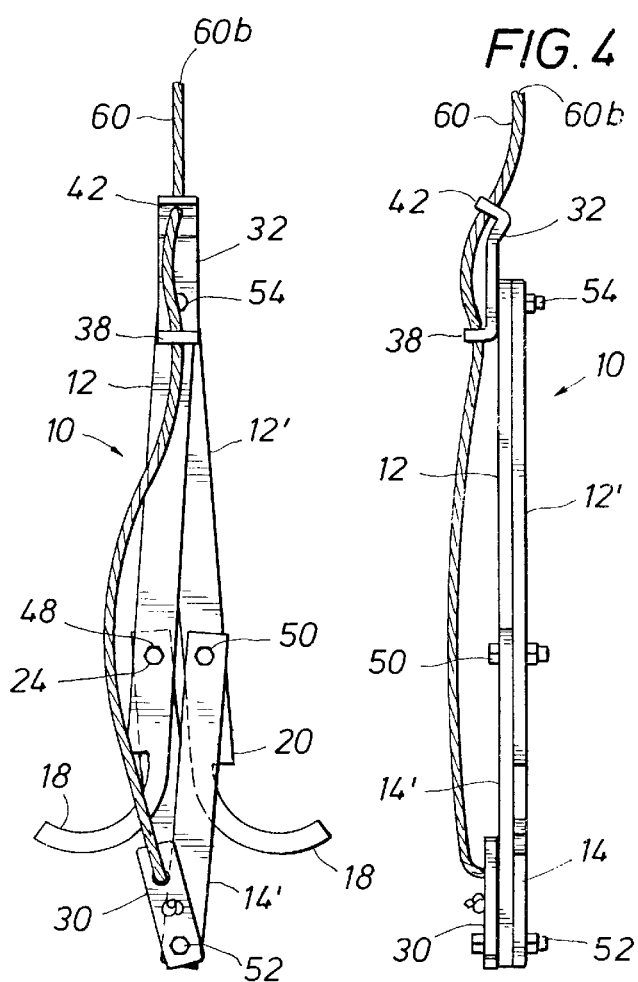
FIG. 3
FIG. 4

5,873,776

WEIGHT-ACTIVATED, EXPANDING GAMBREL APPARATUS AND METHOD OF USING SAME

BACKGROUND OF THE INVENTION

1. Field of the Invention

The present invention relates to devices used to suspend slaughtered animals for field dressing the animals, such devices commonly referred to as gambrels.

2. Description of the Related Art

The sport of big game hunting is of increasing popularity. Once the hunter has killed his game, it is typically necessary for him to transfer the game to a vehicle where it can be transferred to a place for final butchering, processing, etc. Due to the weight of the big game, it is common for the hunter to field dress the game prior to transporting and transferring the animal to the vehicle. Field dressing the animal significantly reduces the dead weight of the slaughtered animal and makes it much easier to handle and manipulate the animal.

Field dressing the animal is most easily accomplished by suspending the animal, such as a deer, from its hind legs. Typically, a hoist lift system is attached to a limb of a tree and a gambrel is attached to the lower end of the hoist. The gambrel is a stiff rod having a pair of end extensions. The end extensions are inserted through the hind legs, typically above the hock. The hock is the joint in the hind leg of a quadruped (such as a deer) corresponding to the ankle of a human but elevated and bending backward.

Typically, the prior art gambrels have a shape generally like that of a coat hanger with a pair of end extensions or hooks pointing upwardly. In the prior art gambrels, the upwardly pointing hooks are maintained a fixed distance apart. This presents a problem to the hunter in mounting the gambrel into the leg portions of the game since the hooks are a fixed distance of approximately 26 inches apart.

It is desirable to have a gambrel having an adjustable spacing between the hook portions of the gambrel to facilitate the mounting of the gambrel to the game. It is also desirable that the gambrel be sturdy and lightweight. It is also desirable that the gambrel be compact for easy storage. It is further desirable that the gambrel expand automatically from the weight of the game as it is being hoisted to a suspended position.

BRIEF SUMMARY OF THE INVENTION

The weight-activated, expanding gambrel apparatus of the present invention includes an adjustable spacing between hook portions of the gambrel apparatus to facilitate the mounting of the gambrel apparatus to the game. The gambrel apparatus is sturdy and lightweight and also collapses easily and compactly for storage. The gambrel apparatus expands automatically from the weight of the game as it is being hoisted to a suspended position.

The expanding gambrel apparatus includes a pair of support arms each having a first end and an arcuate second end forming a hook. The pair of support arms are pivotally connected to each other at the first end. A pair of braces are pivotally connected to each other at a first end. A second end of each brace is pivotally connected to a support arm. A center post is connected to the pivot connection at the first end of the braces and a bracket is connected to the pivot connection at the first end of the support arms. The center post abuts the bracket and maintains the support arm hooks at a certain spacing when supporting the animal. A rope or cable is attached to the center post and has a free end which extends through a pair of holes in the bracket.

The expanding gambrel apparatus has a collapsed position and an expanded position. In the collapsed position, the arcuate end portions of the pair of support arms are closely situated to one another and the center post is separated from the bracket. The arcuate end portion of a first support arm is first inserted through the animal's hind leg near the hock. The other arcuate end portion of the second support arm is then extended to the appropriate location to be inserted into the animal's other hind leg. Depending on the size and type of animal, the distance between the arcuate end portions required to easily insert the arcuate end portion is easily adjusted for the particular situation. A shoulder or stop on the support arms prevent the legs from sliding up the support arms during the insertion and lifting of the animal.

The rope free end extends from the gambrel apparatus and may be connected to a hoisting apparatus for raising and suspending the animal from the gambrel apparatus. As the free end is pulled to raise the animal, the raising of the gambrel apparatus is resisted by the weight of the animal. This results in the rope being tensioned and causing the center post to be forcibly drawn closer to the bracket. As this happens, the pair of braces force the arcuate end portions of the support arms away from one another to expand the gambrel apparatus. With continued tensioning of the rope, the center post will finally abut a lower shoe of the bracket to fully expand the gambrel apparatus. When this occurs, the pair of braces are substantially aligned with each other or angled slightly upward towards the center post. In this configuration, the support arms are secured and maintained a fixed distance apart. Continued tensioning on the rope results in the raising of the gambrel apparatus and the slaughtered animal.

BRIEF DESCRIPTION OF THE VIEWS OF THE DRAWINGS

In order to more fully understand the drawings referred to in the detailed description of the present invention, a brief description of each drawing is presented, in which:

FIG. 1 is a front elevational view of the weight-activated, expanding gambrel apparatus according to the present invention, the gambrel apparatus shown in an expanded position;

FIG. 2 is a sectional view taken along line 2—2 of FIG. 1;

FIG. 3 is a front elevational view of the weight-activated, expanding gambrel apparatus in a collapsed position; and FIG. 4 is a side elevational view of the gambrel apparatus in the collapsed position.

DETAILED DESCRIPTION OF THE INVENTION

Referring now to the drawings in greater detail, the weight-activated, expanding gambrel apparatus, generally designated as 10, is shown in FIGS. 1–4. In FIG. 1 the expanding gambrel apparatus 10 is shown in the expanded position while supporting an animal G. In FIGS. 3 and 4 the gambrel apparatus 10 is shown in a collapsed position from the front and side views, respectively.

Referring to FIGS. 1 and 3, the expanding gambrel apparatus 10 includes a pair of support arms 12 and 12' and a pair of braces 14 and 14'. Each support arm 12, 12' has an elongate portion 22 having a hole 16 (FIG. 2) at a first end of the support arm 12, 12'. Each support arm 12, 12' has a second end having an arcuate end portion or hook 18. The arcuate end portion 18 faces in an upward direction in the expanded position as shown in FIG. 1. In the preferred embodiment, the arcuate end portion 18 is smaller in cross section than the elongate portion 22 of the support arm 12, 12' in order to facilitate the insertion of the arcuate end portion 18 through the leg portion of the animal G as will be explained below. A shoulder or stop 20 is formed at the transition between the arcuate end portion 18 and the elongate portion 22 of the support arm 12. The support arm 12, 12' includes a second hole 24 in the elongate portion 22 near the arcuate end portion 18.

Referring to FIGS. 1 and 2, each brace 14, 14' is a straight member having first and second holes 26 and 28, respectively, near the ends of each brace 14, 14'.

Referring to FIGS. 1–4, the gambrel apparatus 10 also includes a center post 30 and a bracket 32. The center post 30 is a short member having first, second and third holes 34, 35 and 36, respectively, therethrough as shown in FIG. 2. The bracket 32 includes a lower shoe 38 extending substantially perpendicular to a central portion 40 (FIG. 2) of the bracket 32. In the preferred embodiment, the bracket 32 includes an ear 42 at the upper end of the central portion 40. Preferably, the ear 42 includes an inwardly angled portion 42a which reverses to an outwardly and upwardly portion 42b as shown in FIG. 2. The lower shoe 38 includes a hole 44 and the upper ear 42 includes a hole 46.

The assembly of the gambrel apparatus 10 will now be described with reference to FIGS. 1–4. The gambrel apparatus 10 is assembled with a plurality of pin or pivot connections, typically formed with a threaded bolt and nut. It is to be understood that other types of pin connections may be used such as rivets, pins or studs to accomplish the pivot connections described below. The gambrel apparatus 10 includes four pivot connections referred to as 48, 50, 52 and 54. Pivot connections 48 and 50 are formed at the second hole 24 of the support arm 12, 12' and the second hole 28 of the brace 14, 14'. Pivot connection 52 is formed between the pair of braces 14 and 14' and the center post 30. The pin extends through the first hole 26 of the braces 14 and 14' and the first hole 34 of the center post 30 as shown in FIG. 2. The pivot connection 54 is formed between the pair of support arms 12 and 12' and the bracket 32.

A rope or cable 60 is attached to the center post 30. In the preferred embodiment, the rope 60 has a knot 60a at one end and a free end 60b of the rope 60 is passed through the second and third holes 35 and 36, respectively, of the center post 30 as shown in FIG. 2. The rope 60 then extends through the lower hole 44 in the shoe 38 and also through the upper hole 46 in the ear 42 of the bracket 32. The angle of the ear 42 allows the gambrel apparatus 10 to hang vertically when suspended by the rope 60.

Operation of the Present Invention

The operation of the present invention will now be described in detail. Referring to FIGS. 3 and 4, the gambrel apparatus 10 is shown in its collapsed position. The collapsed position is used to store the gambrel apparatus 10 and is also the initial position of the gambrel apparatus 10 when mounting the animal G to the apparatus 10. In the collapsed position, the pivot connection 52 is located below the pivot connections 50 and 48 and the support arms 12 and 12' are closely aligned with one another. As shown in FIGS. 3 and 4, the center post 30 is spaced apart from the bracket 32 in the collapsed position.

It is to be understood that in the collapsed or initial position, the arcuate end portions 18 of the pair of support arms 12 and 12' are closely situated to one another. The arcuate end portion 18 of a first support arm 12 or 12' is first inserted through the animal's hind leg near the hock. The other arcuate end portion 18 of the second support arm 12 or 12' is then extended to the appropriate location to be inserted into the animal's other hind leg. Depending on the size and type of animal G, the distance between the arcuate end portions 18 required to easily insert the arcuate end portion 18 is easily adjusted for the particular situation. The shoulder or stop 20 on the support arms 12, 12' prevent the legs from sliding up the support arms 12, 12' during the insertion and lifting of the animal G.

The free end 60b of the rope 60 extends from the gambrel apparatus 10 and may be connected to a hoisting apparatus (not shown), typically a series of pulleys, for raising and suspending the animal G from the gambrel apparatus 10. As the free end 60b of the rope 60 is pulled to raise the animal G, the raising of the gambrel apparatus 10 is resisted by the weight of the animal G. This results in the rope 60 being tensioned and causing the center post 30 to be forcibly drawn closer to the bracket 32. As this happens, the pair of braces 14 and 14' force the arcuate end portions 18 of the support arms 12 and 12' away from one another to expand the gambrel apparatus 10. With continued tensioning of the rope 60, the center post 30 will finally abut the lower shoe 38 of the bracket 32 to fully expand the gambrel apparatus 10 as shown in FIGS. 1 and 2. When this occurs, the pair of braces 14 and 14' are substantially aligned with each other or angled slightly upward (i.e., the pivot connection 52 is above the pivot connections 48 and 50). In this configuration, the support arms 12 and 12' are secured and maintained a fixed distance apart. Continued tensioning on the rope 60 results in the raising of the gambrel apparatus 10 and the slaughtered animal G. It is to be understood that the separating of the arcuate end portions 18 during the hoisting process spreads the attached hind legs of the animal G which is desirable to facilitate field dressing of the suspended animal G.

It is to be understood that the gambrel apparatus 10 as described above and shown in the drawings can be manufactured with the support arms 12 and 12' being of identical construction. Similarly, the braces 14 and 14' are identical to each other. This simplifies the manufacture of the gambrel apparatus 10 and also reduces the manufacturing cost.

In the preferred embodiment of the present invention, the spacing between the arcuate end portions 18 is in the range of approximately 24 to 28 inches in the expanded position. It is to be understood that the gambrel apparatus 10 can be made to accommodate whatever spacing is desired by adjusting the lengths and sizes of the various members.

In the preferred embodiment of the present invention, the gambrel apparatus 10 is made from aluminum flat bar. The aluminum flat bar is lightweight and provides suitable strength to support the required loads to which the gambrel apparatus 10 will be subjected. Loads in the range of approximately 600 to 800 pounds can be supported from the gambrel apparatus 10. It is to be understood that alternatively the gambrel apparatus 10 could be made from other materials such as steel, stainless steel and high strength plastics. It is also to be understood that other suitable structural shapes other than flat bar may be used.

The foregoing disclosure and description of the invention is illustrative and explanatory thereof, and various changes in the size, shape, and materials, as well as in the details of illustrative construction and assembly, may be made without departing from the spirit of the invention.

What is claimed is:

1. An expanding gambrel apparatus for supporting a load, the gambrel apparatus comprising:

a first support arm having a first end and an arcuate second end;

a second support arm having a first end and an arcuate second end, said first end of said first and second support arms being pivotally connected to each other;

means for varying the distance between said arcuate second ends, said means for varying the distance comprising:

a first brace having a first end and a second end, said second end of said first brace pivotally connected to said first support arm;

a second brace having a first end and a second end, said second end of said second brace pivotally connected to said second support arm, wherein said first ends of said first and second braces are pivotally connected to each other via a pivot connection; and means for maintaining a fixed distance between said arcuate second ends while supporting the load, said means for maintaining a fixed distance comprising:

a centerpost connected to said pivot connection;

a cable having a fixed end securably connected to said center post at a position spaced from said pivot connection, said cable having a free length; and means for stopping the pivotal rotation of said braces in the direction of said first end of said first and second support arms, wherein said first ends of said first and second braces are located above said second ends of said first and second braces when supporting the load so as to lockingly secure the distance between the arcuate ends of said first and second support arms.

2. The apparatus of claim 1, wherein said means for stopping comprises:

a bracket connected to one of said support arms, wherein said center post abuts said bracket when supporting the load.

3. The apparatus of claim 2, wherein said bracket includes a hole therethrough and said fixed end of said cable is attached to said center post and said free end extends through said bracket hole.

* * * * *